United States Patent [19]
Josse et al.

[11] Patent Number: 6,104,929
[45] Date of Patent: Aug. 15, 2000

[54] DATA PACKET RADIO SERVICE WITH ENHANCED MOBILITY MANAGEMENT

[75] Inventors: Thierry Josse, Stockholm, Sweden; Jose Javier Cabero Combarros; Miguel Cobo Esteban, both of Madrid, Spain

[73] Assignee: Telefonaktiebolaget LM Ericsson, Stockholm, Sweden

[21] Appl. No.: 09/090,186

[22] Filed: Jun. 4, 1998

Related U.S. Application Data

[60] Provisional application No. 60/050,306, Jun. 20, 1997, and provisional application No. 60/050,232, Jul. 11, 1997.

[51] Int. Cl.[7] .............................. H04Q 7/20; H04B 1/38
[52] U.S. Cl. .................... 455/445; 455/426; 455/560; 370/379; 370/465
[58] Field of Search ...................... 455/426, 445, 455/560; 370/328, 329, 349, 389, 401, 465, 466; 709/230, 249; 714/748, 749, 750

[56] References Cited

U.S. PATENT DOCUMENTS

| | | | |
|---|---|---|---|
| 5,729,537 | 3/1998 | Billstrom | 370/329 |
| 5,742,668 | 4/1998 | Pepe et al. | 455/415 |
| 5,793,762 | 8/1998 | Penners et al. | 370/389 |
| 5,966,378 | 10/1999 | Hamalainen | 370/348 |
| 5,987,137 | 11/1999 | Karppanen et al. | 360/28 |

FOREIGN PATENT DOCUMENTS

| | | |
|---|---|---|
| 196 11 947 C1 | 6/1997 | Germany . |
| 2 307 828 | 6/1997 | United Kingdom . |

OTHER PUBLICATIONS

Digital Cellular Telecommunications System (Phase 2+), General Packet Radio Service (GPRS) Service Description, TS GSM 03.60 version 2.0.0, May 1997.

Brasche et al, Analysis of Multi–Slot MAC Protocols Proposed for the GSM Phase 2+ General Packet Radio Service, 1997 IEEE 47th Vehicular Technology Conference, Phoenix, AZ, May 4–7, 1997, vol. 2, No. CONF. 47, May 4, 1997, pp. 1295–1300.

*Primary Examiner*—Nguyen Vo
*Assistant Examiner*—Charles N. Appiah
*Attorney, Agent, or Firm*—Nixon & Vanderhye, P.C.

[57] ABSTRACT

The address of a latest Serving GPRS Support Node (SGSN) is provided to a Gateway GPRS Support Node (GGSN) by a special Update SGSN Address Request message which is sent from the SGSN to the GGSN. For a subscriber whose subscription permits, the address of the latest SGSN node is sent in the Update SGSN Address Request message for a qualified packet data protocol (PDP) context. A qualified PDP context (1) has a static PDP address; and (2) is not activated. The Update SGSN Address Request message can be sent from the SGSN to the GGSN in either a GPRS Attach scenario or an Inter-SGSN Routing Area Update Scenario. In response to the Update SGSN Address Request message, the GGSN sends an Update SGSN Address Response message which advises whether the updating of the address for the SGSN at the GGSN has been successful.

24 Claims, 7 Drawing Sheets

Inter SGSN Routing Area Update Procedure

INTER-SGSN ROUTING AREA UPDATE
PROCEDURE

FIG 4

Inter SGSN Routing Area Update Procedure

FIG 5B

MM State Model of SGSN

FIG 5A

MM State Model of MS

DATA PACKET RADIO SERVICE WITH ENHANCED MOBILITY MANAGEMENT

This application claims the benefit and priority of the following United States Provisional patent applications, both of which are entitled "DATA PACKET RADIO SERVICE WITH ENHANCED MOBILITY MANAGEMENT" and are incorporated herein by reference: U.S. Provisional patent application Ser. No. 60/050,306, filed Jun. 20, 1997; U.S. Provisional patent application Ser. No. 60/052,232, filed Jul. 11, 1997.

FIELD OF THE INVENTION

The present invention relates to packetized data transmissions over a radio network, and more particularly, to routing of packets to the proper mobile switch currently serving a mobile radio.

RELATED ART AND OTHER CONSIDERATIONS

In recent years cellular telephones have become increasingly popular. A cellular telephone is just one example of what is referred to in telephone parlance as a "mobile station" or "mobile terminal". A mobile station can take on various forms other than a cellular telephone, including a computer (e.g., a laptop computer) with mobile termination capabilities. Each subscriber having a mobile station is assigned a unique International Mobile Subscriber Identity (IMSI).

Telecommunications services are provided between a cellular telecommunications network and a mobile station over an air interface, e.g., over radio frequencies. At any moment an active mobile station is in communication over the air interface with one or more base stations (BSs). The base stations are, in turn, managed by base station controllers (BSCs), also known as radio network controllers (RNCs). A base station controller (BSC) together with its base stations (BSs) comprise a base station system (BSS). The base station controllers (BSC) of a base station system (BSS) is connected via control nodes to a core telecommunications network.

One type of standardized mobile telecommunications scheme, utilized, e.g., in Europe, is the Global System for Mobile communications (GSM). GSM includes standards which specify functions and interfaces for various types of services. A relatively recent data service available within the GSM system is General Packet Radio Service (GPRS). GPRS differs is from existing data services in that GPRS is a packet switched service instead of a circuit switched data service. Whereas (in GSM) a circuit switched data user is connected continuously to the radio network during a data call (e.g., even when not transferring data), a GPRS user is connected to the radio network only when either (1) the mobile station desires to transmit or (2) the network has something to transmit to the mobile station. In other words, in GPRS the mobile station (e.g., a computer with mobile termination) is not connected to the network constantly while the computer is in use, but only during these two transmission events. Examples of GPRS systems are shown in U.S. patent application Ser. No. 09/069,969 filed Apr. 30, 1998 entitled "Dynamic Allocation of Packet Data Channels," and U.S. patent application Ser. No. 09/069,939 filed Apr. 30, 1998 entitled "Allocation of Channels for Packet Data Services," both of which are incorporated herein by reference.

Control nodes can take various forms, depending on the types of services or networks to which the control nodes are connected. For connecting to connection-oriented, circuit switched networks such as PSTN and/or ISDN, the control node can be a mobile switching center (MSC), which often is associated with a visiting location register (VLR). For connecting to the general packet radio services (GPRS) such as Internet (for example), the control node can be a gateway GPRS support node (GGSN). In a GPRS system, there also may be one or more Serving GPRS Support Nodes (SGSN). The SGSN is the node that serves the mobile station, e.g., the node which performs mobility management context at GPRS attachment and establishment of PDP context at PDP context activation. Importantly, the address of the SGSN node currently serving a GPRS-utilizing mobile station must be known by the GGSN in order for data packets to be routed between the data packet networks and the mobile station.

An owner of a mobile station typically enters into a contract or subscription agreement with a service provider (e.g., a company which operates the telecommunications network through which the mobile station engages in telecommunications connections). As part of the subscription agreement, the mobile station is categorized as belonging to one of several access classes available on the network. Subscription data from the subscription agreement is stored in a record maintained e.g., in a home location register (HLR) for the mobile station.

A mobile subscriber who is roaming moves freely within the network, with the network knowing where the mobile station is located. This makes it possible for the mobile subscriber to receive a call regardless of location. To keep the network up to date with the subscriber location, the mobile station informs the system whenever it changes location area. This is called location updating.

One type of location updating is known as an "attach". An IMSI attach is used by the mobile station to notify the system that it is in active mode again, provided that it is in the same location area as it was when it entered the inactive state.

One prior art attach implementation is the GSM attach procedure described *Digital Cellular Telecommunications System (Phase 2+), General Packet Radio Service (GPRS) Service Description*, TS GSM 03.60 version 2.0.0, the entirety which is explicitly incorporated herein by reference, including section 6.5 thereof.

Generally, in the GSM attach procedure, a mobile station having GPRS capability sends an Attach Request message to a SGSN node. The SGSN node performs identification, authentication, and IMEI operations. The SGSN node then sends an Update Location message to the home location register (HLR) of the mobile station. The HLR performs cancel location procedures, and thereafter performs Insert Subscriber Data procedures with respect to the mobile station. In so doing, the HLR sends certain subscriber data for the mobile station to the SGSN. The SGSN, upon receiving the subscriber data from the HLR, returns an Update Ack message as an acknowledgment. Thereafter, location updating procedures are performed, followed by transmission of an Attach Accept message from the SGSN to the mobile station.

It is reiterated that the address of the SGSN node currently serving a GPRS-utilizing mobile station must be known by the Gateway GPRS Support Node (GGSN) in order for data packets to be routed between the data packet networks and the mobile station. In the prior art, the Gateway GPRS Support Node is informed of the address of the latest Serving GPRS Support Node only (1) when Packet Data Protocol Context activation is performed, or (2) when there is an inter-SGSN routing update.

The prior art occasions for informing the Gateway GPRS Support Node (GGSN) of the address of the latest Serving GPRS Support Node (SGSN) do not cater to all uses of the mobile station. In this regard, a PDP Context activation procedure is performed by the mobile station only in order to be able to send/receive Packet Switched information. Thus, the prior art does not provide the end-user with the ability to receive data packets until this PDP Context activation procedure is performed due to the fact that the GGSN does not have the SGSN address.

It has previously been proposed to provide a separate interface between the Gateway GPRS Support Node (GGSN) and the HLR, which contains the subscription data for the mobile station, in order to provide the address of the latest Serving GPRS Support Node (SGSN) to the GGSN. However, such would require that an entirely new interface with new protocols be established and implemented.

What is needed, therefore, and an object of the present invention, is a technique for informing the Gateway GPRS Support Node of the address of the latest Serving GPRS Support Node under more generalized circumstances.

BRIEF SUMMARY OF THE INVENTION

The address of a latest Serving GPRS Support Node (SGSN) is provided to a Gateway GPRS Support Node (GGSN) by a special Update SGSN Address Request message which is sent from the SGSN to the GGSN. For a subscriber whose subscription permits, the address of the latest SGSN node is sent in the Update SGSN Address Request message for a qualified packet data protocol (PDP) context. A qualified PDP context (1) has a static PDP address; and (2) is not activated.

The Update SGSN Address Request message can be sent from the SGSN to the GGSN in either a GPRS Attach scenario or an Inter-SGSN Routing Area Update Scenario. In response to the Update SGSN Address Request message, the GGSN sends an Update SGSN Address Response message which advises whether the updating of the address for the SGSN at the GGSN has been successful.

The invention also involves introducing a new field, entitled "SGSN Address Updating Allowed". The SGSN Address Updating Allowed" field appears both (1) in the subscription for the mobile station in the mobile station's home location register (HLR); and (2) in the PDP context information maintained by the SGSN. In this field an operator can specify that the PDP contexts for the subscriber, which PDP contexts have an inactive PDP state and a static PDP address, can provide their SGSN address to their GGSN following either a successful GPRS attach procedure or an Inter-SGSN Routing Area Update procedure. The SGSN Address Updating Allowed field is set by an operator, e.g., by operator command.

BRIEF DESCRIPTION OF THE DRAWINGS

The foregoing and other objects, features, and advantages of the invention will be apparent from the following more particular description of preferred embodiments as illustrated in the accompanying drawings in which reference characters refer to the same parts throughout the various views. The drawings are not necessarily to scale, emphasis instead being placed upon illustrating the principles of the invention.

DETAILED DESCRIPTION OF THE DRAWINGS

In the following description, for purposes of explanation and not limitation, specific details are set forth such as particular architectures, interfaces, techniques, etc. in order to provide a thorough understanding of the present invention. However, it will be apparent to those skilled in the art that the present invention may be practiced in other embodiments that depart from these specific details. In other instances, detailed descriptions of well known devices, circuits, and methods are omitted so as not to obscure the description of the present invention with unnecessary detail.

Figure 1:
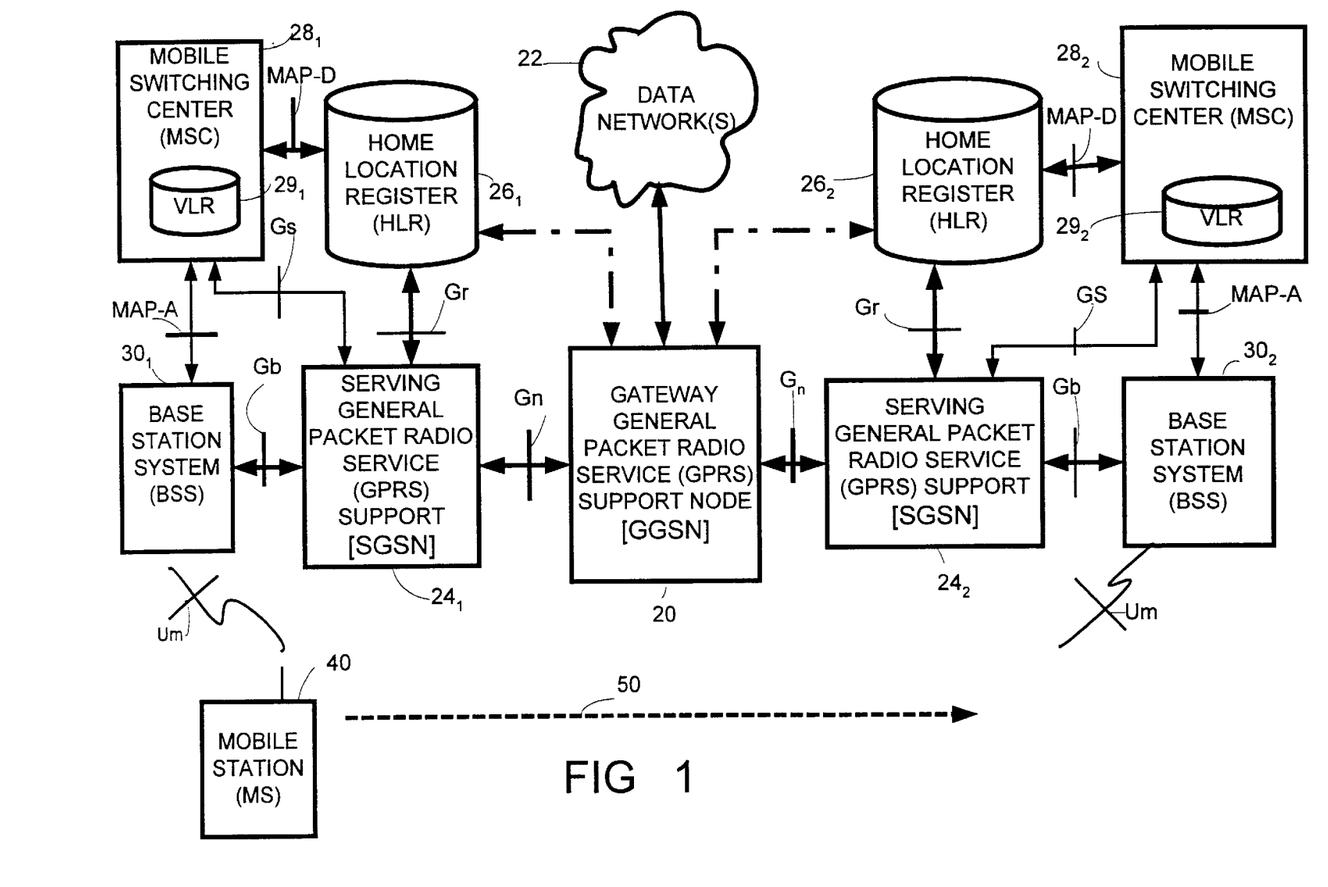
FIG. 1 is a schematic view of a cellular telecommunications network according to an embodiment of the invention and showing a mobile station served by a first base station system and a first SGSN node.

FIG. 1 shows an example cellular telecommunications network having GPRS capability for which the invention is useful. The network of FIG. 1 is shown using GSM-type terminology. While a preferred implementation is described in a GSM context/application, the present invention may be employed in other radio communications networks.

FIG. 1 shows that gateway general packet radio service (GPRS) support node (GGSN) 20 is connected to one or more data networks, such as the Internet, as represented by cloud 22. GGSN 20 communicates over a Gn interface with one or more serving general packet radio service support nodes (SGSN), of which two representative SGSNs are shown as $24_1$ and $24_2$. The SGSN $24_1$ communicates with (1) home location register (HRL) node $26_1$ using a Gr interface; (2) mobile switching center (MSC) node $28_1$ (which includes visiting location register (VLR) $29_1$) using a Gs interface; and (3) base station system (BSS) $30_1$ using a Gb interface. The base station system (BSS) $30_1$ communicates with various mobile radio stations, such as mobile station (MS) 40 shown in FIG. 1, over an air interface Um. A MAP-D protocol is employed for communications between HLR $26_1$ and MSC/VLR node $28_1$. A MAP-A protocol is employed for communications between MSC/VLR node $28_1$ and nodes of base station system (BSS) $30_1$.

A mirror image of the network configuration above described is connected through SGSN $24_2$, the reference numerals of the nodes and systems of mirrored configuration having the subscript 2 rather than 1. It should be understood that there need not necessarily be an identical mirroring, and that such representation is merely for sake of illustrative convenience. Moreover, more SGSNs may be and likely are connected to GGSN 20, so that the overall next work may be quite complex.

A dashed-dotted line shown between each of HLR $26_1$ and HRL $26_2$ and GGSN 20 indicates that a possible communications path could be established between each of the HLRs and the GGSN 20. However, such communications path would require that an entirely new interface be established and implemented. As explained below, the present invention eliminates the need for such involved interfaces/protocols between the HLRs and GGSN 20.

Mobile station (MS) 40 is capable of using one or more general packet radio services (GPRSs). The operator of the telecommunications network shown in FIG. 1 has a subscription agreement for mobile station (MS) 40. The subscription agreement specifies various terms and conditions concerning and governing operation of mobile station (MS) 40. Data including subscription data reflecting e.g., certain ones of these subscription terms and conditions for mobile station (MS) 40 is stored in HLR 26$_1$.

In the above regard, in a telecommunications network each mobile station has a location register which is considered its "home" register. In the illustrated example, HLR 26$_1$ is the "home" register for mobile station (MS) 40. HRL 26$_1$ thus has a record for each of the mobile stations for which it is "home", including a record for mobile station (MS) 40.

An example format of a prior art GPRS subscription data record stored in HLR 26$_1$ is shown in Table 1. The first field of a record in HLR 26$_1$ identifies the particular mobile station to which the record belongs, the first record containing the International Mobile Subscriber Identity (IMSI) of the mobile station, which is unique for each mobile station. For each packet data protocol type which the mobile station (MS) 40 is eligible to utilize (depending e.g., on its subscription agreement), the record in HLR 26$_1$ also contains a "context".

Basically stated, a "context" is data needed for a subscriber to use a specific packet data protocol (PDP), for example X.25. An example context for one packet data protocol ("PDP") is shown as the group of last six fields of Table 1. If mobile station (MS) 40 is eligible to use two packet data protocols, two such groups of fields would be included in the record; if three packet data protocols are eligible, three such groups are included, and so forth.

In general, "activation" of a PDP context enables the SGSN to establish a PDP context for a subscriber (see Table 3) and enables the subscriber's mobile station to send and receive packet data. A "static PDP" address is associated with the subscriber's mobile ID and is allocated at the PDP context subscription.

For reasons explained below, the current invention augments the record in the HLR 26$_1$ with a new field which is shown in Table 2. The field newly added by the present invention is entitled the "SGSN Address Updating Allowed" field. The SGSN Address Updating Allowed" field basically specifies whether the subscriber is allowed to update its SGSN address to its GGSN when (1) the subscriber is not GPRS active and (2) after a GPRS Attach procedure or an Inter-SGSN Routing Area Update procedure. It should be understood that identity of other fields and the ordering of fields in the records of HLR 26$_1$ are not critical to the present invention, but that the format of Table 1 is provided merely as an example of one specific implementation.

At the time shown in FIG. 1, GGSN 20 knows how to route incoming requests for packet radio connections to mobile station (MS) 40. In particular, at the instance shown in FIG. 1, if a data packet connection to mobile station (MS) 40 were requested, GGSN 20 would consult HLR 26$_1$. GGSN 20 would learn the SGSN Address for mobile station (MS) 40, e.g., SGSN 24$_1$ from the second field of the record for mobile station (MS) 40 in HLR 26$_1$ (assuming the format of Table 1).

A complication occurs when mobile station (MS) 40 moves to another location that is not served by SGSN 24$_1$. An example of such a complication is illustrated as mobile station (MS) 40 moves along path 50 of FIG. 1 to the position shown in FIG. 2. In the location shown in FIG. 2, mobile station (MS) 40 is in radio contact with base station system (BSS) 30$_2$ rather than base station system (BSS) 30$_1$, and thus comes under the jurisdiction of SGSN 24$_2$ rather than SGSN 24$_1$. However, at this point in time GGSN 20 is oblivious to the fact that, for data packet services, mobile station (MS) 40 is now served by SGSN 24$_2$ rather than SGSN 24$_1$.

Figure 2:
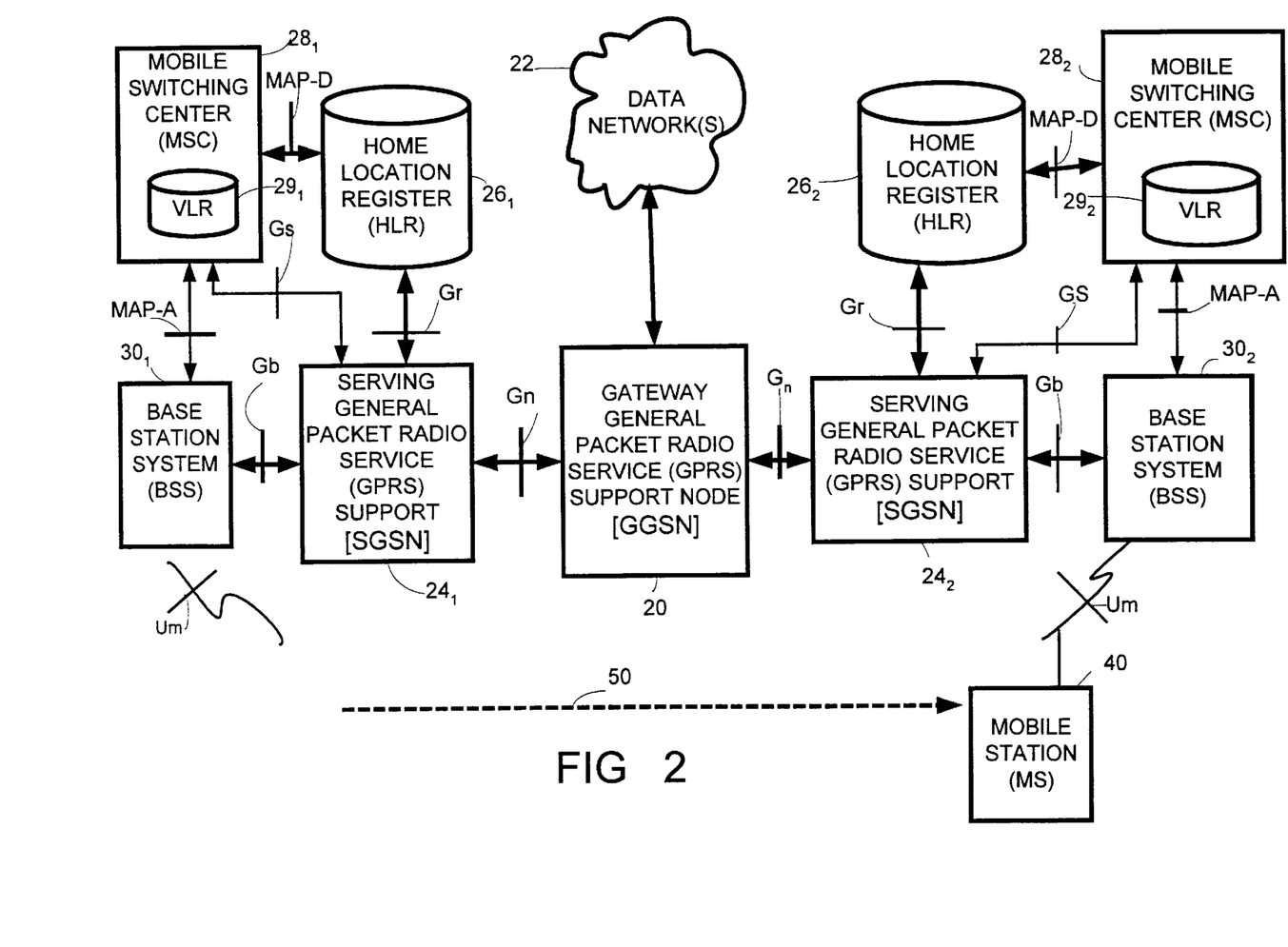
FIG. 2 is a schematic view of the cellular telecommunications network of FIG. 1 but having the mobile station served by a second base station system and a second SGSN node.

Under certain circumstances GGSN 20 would eventually be apprised that, in the situation of FIG. 2, mobile station (MS) 40 is served by SGSN 24$_2$ rather than SGSN 24$_1$. One such circumstance is when mobile station (MS) 40 seeks to activate one of its packet data services by initiating a packet data transmission from mobile station (MS) 40, such activation being referred to as a PDP context activation. Another circumstance accompanies inter-SGSN routing updating signaling. Yet until one of these circumstances occurs, mobile station (MS) 40 is unable to receive data packets because GGSN 20 does not have the current SGSN address.

The present invention provides GGSN 20 with the current SGSN address, and thereby allows mobile station (MS) 40 to receive data packets even before mobile station (MS) 40 performs any PDP context activation. In particular, the present invention allows mobile station (MS) 40 to "attach" to an SGSN. The present invention enhances MS mobility management by transferring the address of the SGSN currently serving mobile station (MS) 40 to the HLR by way of the Gn interface between GGSN and SGSN.

Thus, the present invention provides GGSN 20 with the current SGSN address by having the SGSN send GGSN 20 its address under certain circumstances. The SGSN address is provided to GGSN 20 in a new message known as the Update SGSN Address Request message. For a subscriber whose subscription permits, the address of the latest SGSN node is sent in the Update SGSN Address Request message for a qualified packet data protocol (PDP) context. A qualified PDP context (1) has a static PDP address; and (2) is not activated. As explained separately below, the Update SGSN Address Request message can be sent from the SGSN to the GGSN in either a GPRS Attach scenario or an Inter-SGSN Routing Area Update Scenario.

GPRS Attach Scenario

Prior to discussing Attach procedure details, it is preliminarily mentioned that a GPRS-attached mobile station can use its IMSI to attach to the SGSN. This invention particularly concerns mobile stations with GPRS capabilities; a mobile station that is not GPRS-attached makes an IMSI attach, as described (for example) in the Global Systems for Mobile communication (i.e., GSM). An IMSI-attached class-A mobile station engaged in a circuit switched (CS) connection does not indicate that it is IMSI-attached when it performs a GPRS attach. In the attach function, the MS provides its IMSI and an indication of which type of attach that is to be executed. The different types of attach are IMSI attach, GPRS attach, and combined IMSI/GPRS attach.

IMSI (or old TLLI) is used as an identifier during the attach procedure until a new TLLI is allocated. After having executed the GPRS lo attach, the mobile station is in READY state, and MM contexts are established in the mobile station and the SGSN. The mobile station may then activate PDP contexts as described in subclause "PDP Context Activation and Deactivation Functions" of the GSM documentation.

An IMSI-attached class-C mobile station follows the normal IMSI detach procedure before it makes a GPRS attach. A GPRS-attached class-C mobile station performs a GPRS detach before it makes an IMSI Attach.

The SGSN address for this particular mobile station's location is stored in the HLR so that changes in subscriber data can be communicated to the SGSN. If new subscriber data is received in the SGSN, and if the mobile station is GPRS-attached, the SGSN may, if required, command the mobile station to make a new GPRS attach and new PDP context activations so that the new subscriber data is taken into use.

Figure 3:
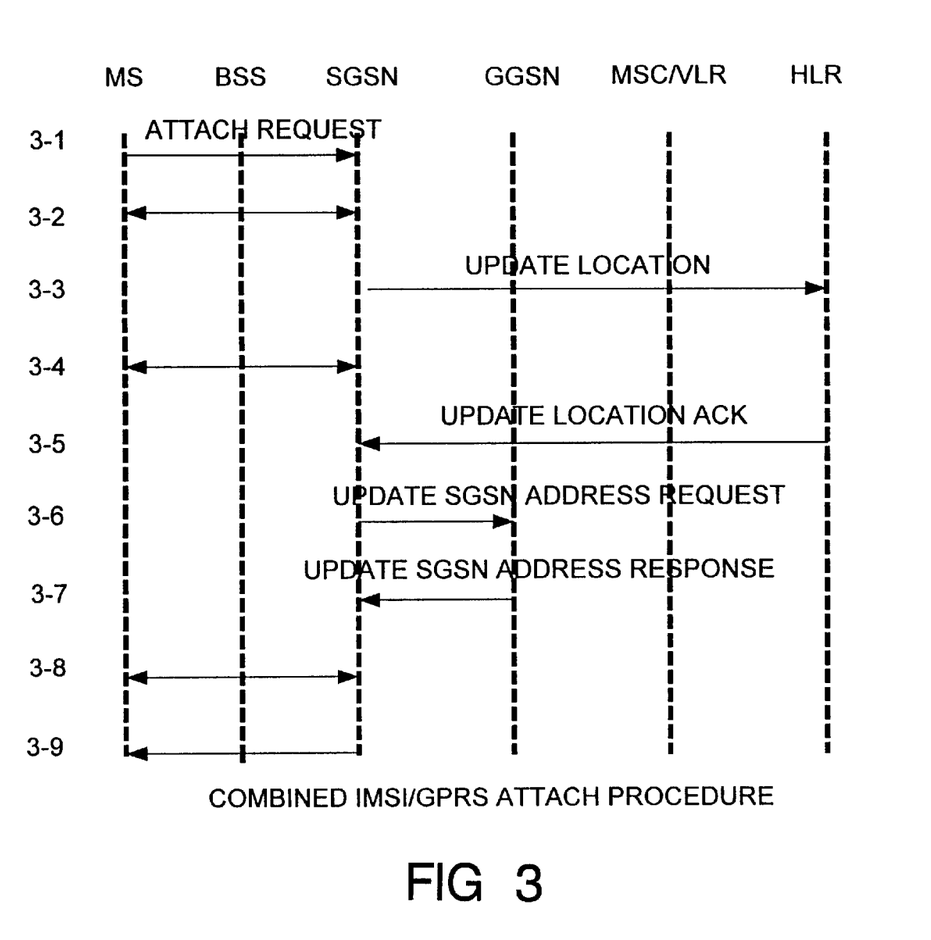
FIG. 3 is a diagrammatic view of general signal flow for a combined IMSI/GPRS Attach procedure according to a mode of the invention.
Figure 3A:
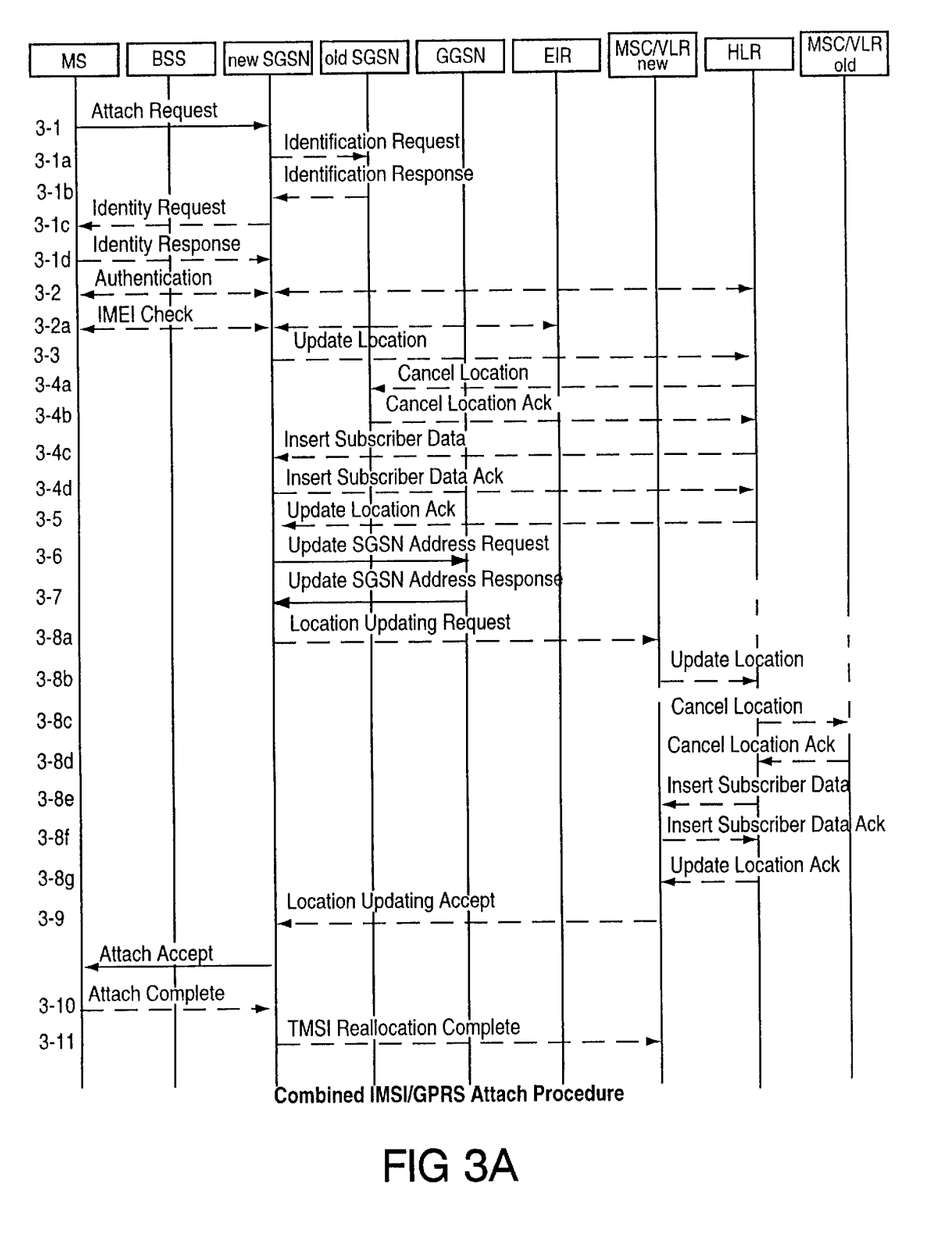
FIG. 3A is a more detailed diagrammatic view of the signal flow for the combined IMSI/GPRS Attach procedure of the mode of FIG. 3.

The GPRS Attach Scenario is first described generally with respect to FIG. 3, and then in more detail with reference to FIG. 3A. The GPRS Attach Scenario, which is a combined IMSI/GPRS Attach procedure, is described with reference to the example and illustrative network topology presented in FIG. 2 in which, yet unknown to GGSN 20, mobile station (MS) 40 has just come into the jurisdiction of SGSN $24_2$.

At step 3-1 of FIG. 3, mobile station (MS) 40 sends an Attach Request message to SGSN $24_2$. Step 3-2 depicts performance of Identification, Authentication, and IMEI operations. At step 3-3 SGSN $24_2$ sends a Update Location message to HLR $26_1$. Step 3-4 reflects Cancel Location procedures and Insert Subscriber Data (ISD) procedures initiated by HLR $26_1$. In connection with these ISD procedures, the ISD operation is modified for GPRS in order to carry GPRS related information such as PDP Types, PDP Addresses, QoS Subscribed, etc. (See Table 4 of section 13.1 of TS GSM 03.60).

Step 3-5 of FIG. 3 shows HLR $26_1$ sending an Update Location Ack message to SGSN $24_2$. After receipt of the Update Location Ack message, SGSN $24_2$ sends a new message of the invention—the Update SGSN Address Request message—to GGSN 20 as shown by step 3-6. The Update SGSN Address Request message provides the new SGSN address, i.e., the address of SGSN $24_2$ for all PDP contexts which have a Static PDP address, which are not activated, and for which an operator has indicated that address notification is permitted. Thereafter, GGSN 20 responds by sending an Update SGSN Address Response message to SGSN $24_2$ as indicated by step 3-7. The Update SGSN Address Response message advises whether the updating requested by the Update SGSN Address Request message has been successful.

After SGSN $24_2$ has informed, or at least attempted to inform, GGSN 20 of the address of SGSN $24_2$, Location Update procedures are performed as generally indicated by step 3-8. Following Location Update, at step 3-8 SGSN $24_2$ sends an Attach Accept message to mobile station (MS) 40. Thus, two new GPRS Tunneling Protocol (GTP) messages, the Update SGSN Address Request message and the Update SGSN Address Response message, are provided by the present invention. These two new GTP messages, as well as details of one embodiment of implementation of the general procedure shown in FIG. 3, are described in more detail in connection with FIG. 3A. Steps shown in FIG. 3 have the same steps numbers in FIG. 3A, with FIG. 3A also showing various substeps or suboperations for procedures and operations only generally shown in FIG. 3.

At step 3-1 of FIG. 3A, mobile station (MS) 40 makes its identity (e.g., its IMSI) known to the SGSN serving base station system $30_2$, i.e., SGSN $24_2$, by sending an Attach Request message. The Attach Request message of step 3-1 includes e.g., the following informational parameters relative to mobile station (MS) 40: IMSI, MS Class, Classmark, CKSN, Attach Type, and DRX Parameters. The Attach Request message is sent via base station system $30_2$ to SGSN $24_2$.

The informational parameters included in the Attach Request message of step 3-1 are now briefly discussed. The "MS Class" parameter indicates whether the mobile station is a class-A, class-B, or class-C mobile station. The "Classmark" parameter contains the mobile station's GPRS multislot capabilities and supported GPRS ciphering algorithm in addition to existing classmark parameters. The "Attach Type" parameter indicates which type of attach is to be performed, i.e., GPRS Attach only, IMSI Attach only, or a combined GPRS and IMSI Attach. A combined GPRS and IMSI attach is used also in the case of a GPRS Attach when the MS is already IMSI-attached. The "DRX" (Discontinuous receive) Parameters indicate whether the mobile station uses discontinuous reception or not. If the mobile station uses discontinuous reception, then DRX Parameters also indicate when the mobile station is in a non-sleep mode and therefore able to receive paging requests and channel assignments.

If, rather than using its IMSI in the Attach Request message, the mobile station (MS) 40 identifies itself with a TLLI (in the scenario illustrated in FIG. 2 in which the current SGSN has changed since detach), at step 3-1$a$ the new SGSN (e.g., SGSN $24_2$) sends an Identification Request to the old SGSN (e.g., SGSN $24_1$) to request the IMSI of mobile station (MS) 40. At step 3-1$b$ the old SGSN (SGSN $24_1$) responds with Identification Response message. Identification Response message includes the IMSI of mobile station (MS) 40, and Authentication Triplets. If mobile station (MS) 40 is not known in the old SGSN, the old SGSN responds with an appropriate error message.

If the TLLI is unknown in both the old SGSN $24_1$ and new SGSN $24_2$, at step 3-1$c$ the new SGSN $24_2$ sends an Identity Request message to mobile station (MS) 40. The Identity Request message to elicit the Identity Type of mobile station (MS) 40. As indicated by step 3-1$d$, mobile station (MS) 40 responds with an Identity Response message which includes the IMSI of mobile station (MS) 40. The mobile station (MS) 40 uses its IMSI to identify itself until a TLLI is allocated.

FIG. 3A shows various aspects of the authentication, security, and equipment checking operations generally depicted as steps 3-2 and 3-2$a$ in FIG. 3. These authentication functions are conventional, such as those which are defined in the subclause "Security Functions" in the document *Digital Cellular Telecommunications System (Phase 2+), General Packet Radio Service (GPRS) Service Description*, TS GSM 03.60 version 2.0.0. If no (mobility management) MM context for mobile station (MS) 40 exists anywhere in the network, then authentication is mandatory. Ciphering procedures are described in subclause "Security Functions." If TLLI allocation is going to be done, and if ciphering is supported by the network, the ciphering mode is set. The equipment checking functions of step 3-2$a$ are conventional and routine in the art.

Step 3-3 of FIG. 3 is also shown in FIG. 3A, and involves SGSN $24_2$ sending an Update Location message to the HLR of mobile station (MS) 40, i.e., HLR $26_1$. The Update Location message includes the SGSN Address and the IMSI of mobile station (MS) 40.

In response to the Update Location message of step 3-3, the Cancel Location and ISD procedures (depicted generally as step 3-4 in FIG. 3) are performed. In showing these procedures in more detail, FIG. 3A illustrates as step 3-4*a* the HLR 26₁ sending a Cancel Location message to the old SGSN 24₁. The Cancel Location message includes the IMSI of mobile station (MS) 40. Upon receipt of the Cancel Location message, the old SGSN 24₁ removes the mobility management (MM) and PDP contexts and at step 3-4*b* acknowledges such cancellation with a Cancel Location Ack message. The Cancel Location Ack message includes the IMSI of mobile station (MS) 40.

After the Cancel Location operations are performed, the Insert Subscriber Data (ISD) operations follow. In this regard, at step 3-4*c*, HLR 26₁ sends an Insert Subscriber Data message to the new SGSN 24₂. In the Insert Subscriber Data operation, HLR 26₁ sends all relevant GPRS information for each PDP type for mobile station (MS) 40. The Insert Subscriber Data message of step 3-4*c* thus includes the IMSI and GPRS subscription data (see Table 1 and Table 2) for mobile station (MS) 40. The Insert Subscriber Data for a PDP type is understood with reference to Table 1.

At step 3-4*d* the new SGSN 24₂ acknowledges with an Insert Subscriber Data Ack message which includes the IMSI of mobile station 40. At this point the new SGSN 24₂ validates the presence of mobile station (MS) 40 in the (new) routing area (RA). If due to regional, national, or international restrictions mobile station (MS) 40 is not allowed to attach in the RA or subscription checking fails, then SGSN 24₂ rejects the Attach Request with an appropriate message. If all checks are successful then SGSN 24₂ constructs a mobility management (MM) context for mobile station (MS) 40. An example mobility management (MM) context is shown in Table 3.

After completion of the ISD procedures, as indicated both in FIG. 3 and FIG. 3A, at step 3-5 HLR 26₁ acknowledges the Update Location message of step 3-3 by sending an Update Location Ack message to the new SGSN 24₂ after the canceling of old MM context and insertion of new MM context are finished.

In view of the receipt of the Insert Subscriber Data, SGSN 24₂ checks to see if there are any PDP States which (1) are not active, and (2) for which the HLR allows the SGSN to inform the GGSN of the new SGSN's address. If any PDP States meet these two criteria, a new message—the Update SGSN Address Request message—is sent at step 3-6 from SGSN 24₂ to GGSN 20. In the Update SGSN Address Request message SGSN 24₂ provides, for all PDP Contexts having a Static PDP address that are not activated, the address of the new SGSN (i.e., SGSN 24₂).

The information elements in the Update SGSN Address Request message of step 3-6 include the following: information element, IMSI, SGSN Address, and Update Reason. The Update Reason information element of the Update SGSN Address Request message can have either of two values. A first of the values indicates that the update was initiated by a GPRS Attach Procedure (the situation presently described with respect to FIG. 3 and FIG. 3A). The second of the values indicates that the update was initiated by a GPRS Inter SGSN Routing Area Update Procedure (a situation subsequently described with respect to FIG. 4 and FIG. 4A). This information may be used by the GGSN for Statistics purposes or used by the GGSN depending on how the GGSN obtained the SGSN address.

As mentioned above, in the present invention, an additional field known as "SGSN Address Updating Allowed" field (see Table 2) for GPRS subscription data is introduced in HLR 26₁ and in SGSN 24₂. The "SGSN Address Updating Allowed" field allows the operator to select which PDP Contexts having a static PDP address will provide an SGSN address to the GGSN 20 following a successful GPRS attach procedure or an Inter SCSN Routing Area Update procedure when their PDP State is inactive. The operator, by command, sets the value of the "SGSN Address Updating Allowed" field in HLR 26₁ (see Table 2).

The field of Table 2 is added to and updated, not only in the HLR GPRS Subscription Data shown in Table 1, but also in the SGSN mobility management (MM) and PDP Contexts shown in Table 3.

In response to the Update SGSN Address Request message from SGSN 24₂ at step 3-6, at step 3-7 GGSN 20 sends an Update SGSN Address Response message back to SGSN 24₂, advising whether the updating of the address for the new SGSN 24₂ has been successful or not. The Update SGSN Address Response message of step 3-7 is sent from the GGSN node to the new SGSN 24₂ as part either of the GPRS Attach procedure or the GPRS Inter SGSN Routing Area Update procedure. The information elements in an Update SGSN Address Response message include an Information Element and a Cause.

FIG. 3 shows generally by step 3-8 certain Location Update procedures which are described in more detail in FIG. 3A with reference to steps 3-8*a* through 3-8*g*. If the Attach Request of mobile station (MS) 40 at step 3-1 is for an IMSI attach, then the new SGSN 24₂ forwards the IMSI attach to the VLR of the new MSC 28₂. The address of VLR 29₂ is derived form the RA information. In this regard, if mobile station (MS) 40 is already IMSI-attached and is doing a GPRS attach, an association is created by sending (at step 3-8) a Location Updating Request message to VLR 29₂. This marks mobile station (MS) 40 as GPRS-attached in VLR 29₂. The Location Updating Request message sent to VLR 29₂ includes the new LAI, IMSI, SGSN Address, GPRS Attach State, MS Class. The GPRS Attach State included in the Location Updating Request message indicates that the mobile station is attached to GPRS, so that VLR 29₂ creates an association with the new SGSN 24₂ by storing SGSN Address and MS Class.

If the LA update is inter-MSC (which does occur in the scenario illustrated in FIG. 2), the new VLR 29₂ sends an Update Location message to HLR 26₁ as shown by step 3-8*b*. The Update Location message of step 3-8*b* includes the IMSI of mobile station (MS) 40 and the new VLR. In response, the HLR 26₁ sends a Cancel Location message to the old VLR 29₁. The Cancel Location message includes the IMSI of mobile station (MS) 40. As shown by step 3-8*d*, the old VLR 29₁ acknowledges by sending a Cancel Location Ack message, which also includes the IMSI of mobile station (MS) 40. Then, at step 3-8*e*, HLR 26₁ sends an Insert Subscriber Data message to the new VLR 29₂. The Insert Subscriber Data message includes, for mobile station (MS) 40, the IMSI and GSM subscriber data obtained from in mobile station (MS) 40's record in VLR 29₁. Receipt of the Insert Subscriber Data message is acknowledged by VLR 29₂ at step 3-8*f* with an Insert Subscriber Data Ack message. The Insert Subscriber Data Ack message includes the IMSI of mobile station (MS) 40. After finishing the inter-MSC location update procedures, at step 3-8*g* the HLR 26₁ responds with an Update Location Ack message to the new VLR 29₂, the Update Location Ack message including the IMSI of mobile station (MS) 40. The new VLR 29₂ can then respond to new SGSN 24₂ at step 3-8*h* with a Location Updating Accept message. The Location Updating Accept message includes the TMSI.

At step 3-9 SGSN 24₂ sends an Attach Accept message to mobile station (MS) 40. The Attach Accept message includes the TLLI for mobile station (MS) 40, the PLMN-supported MT-capabilities parameter, and the TMSI.

If the PLMN-Supported MT-Capabilities parameter received by mobile station (MS) 40 at step 3-9 indicates that only GPRS MS Class C mode of operation is supported (i.e., the Gs interface is not installed), then a Class-A or B MS shall either: (1) perform an explicit IMSI detach via the non-GPRS control channels (if mobile station (MS) 40 was already IMSI-attached); (2) access the non-GPRS control channels for CS operation (the way that CS operation is performed in parallel with GPRS operation is a MS implementation issue outside the scope of this specification); or (3) avoid all CS signaling (in which case mobile station (MS) 40 is implicitly IMSI detached after a while). If only MS Class C mode of operation is supported, and mobile station (MS) 40 requested an IMSI attach, then the IMSI attach is not performed.

If, upon receipt of the Attach Accept message, mobile station (MS) 40 discerns that either TLLI or TMSI has changed, at step 3-10 mobile station (MS) 40 acknowledges the received TLLI and/or TMSI with an Attach Complete message. The Attach Complete message includes the TLLI and TMSI values. If TMSI were changes, at step 3-11 the new SGSN $24_2$ confirms the TMSI re-allocation by sending a TMSI Reallocation Complete message (which includes the TMSI value) to VLR $29_2$.

If the Attach Request cannot be accepted, SGSN $24_2$ returns an Attach Reject message to mobile station (MS) 40. The Attach Reject message includes the IMSI and a Reject Cause parameter.

INTER-SGSN ROUTING AREA UPDATE PROCEDURE

Figure 4:
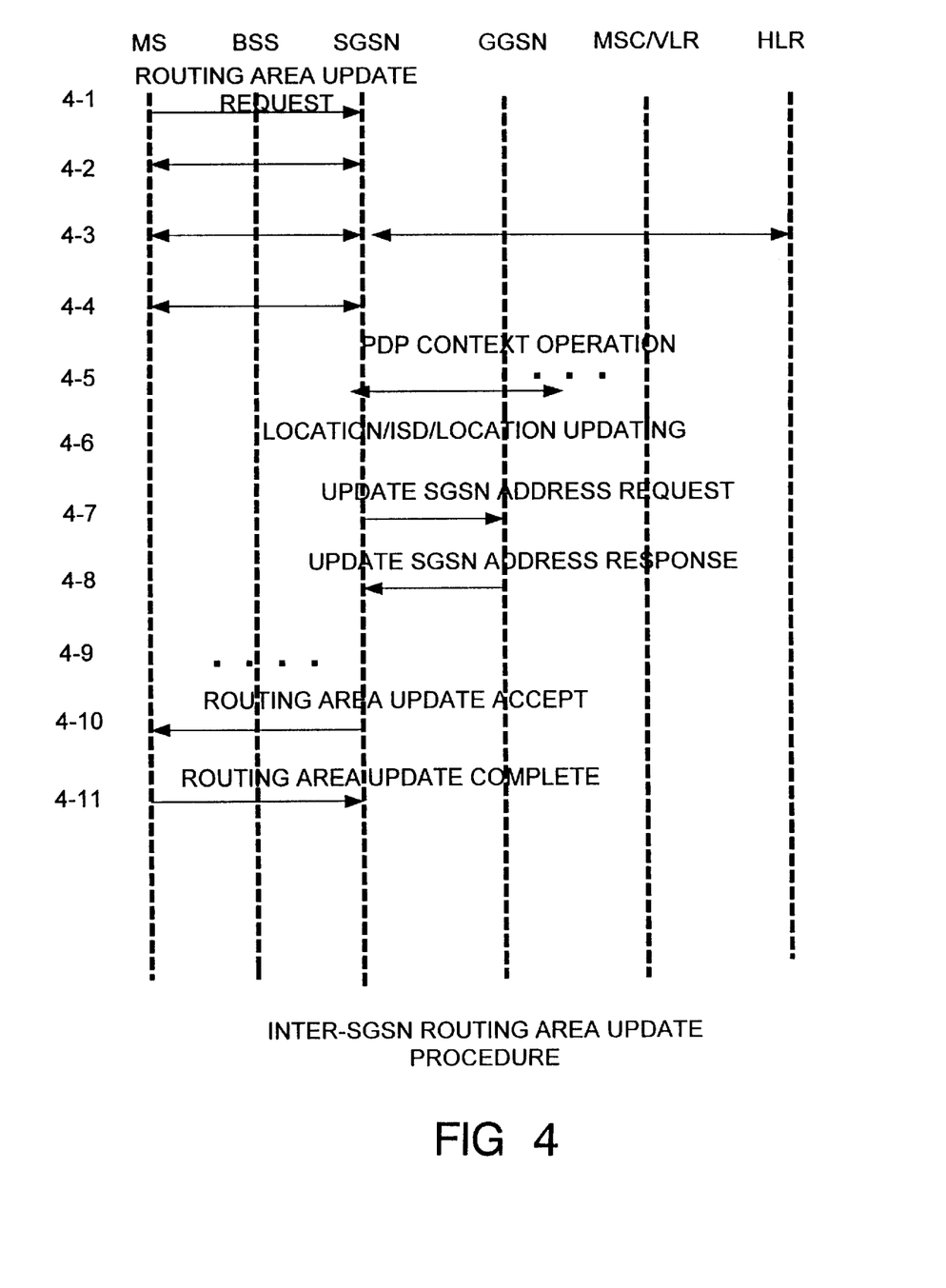
FIG. 4 is a diagrammatic view of general signal flow for an Inter-SGSN Routing Area Update procedure according to a mode of the invention.

FIG. 4 shows general signal flows an Inter SGSN Routing Area Update Scenario which features the two new GTP messages utilized by the invention, i.e., the Update SGSN Address Request message and the Update SGSN Address message. In the scenario of FIG. 4, the new SGSN $24_2$ informs GGSN 20 of its address for each PDP Context (1) that is not active; (2) which has an address which is a static address; and (3) for which the operator permits update of new SGSN address to its GGSN when performing Inter SGSN Routing Area Update.

Step 4-1 of FIG. 4 shows mobile station (MS) 40 sending a Routing Area Update Request message to SGSN $24_2$. At step 4-2 SGSN $24_2$ performs a SGSN Context procedure and Forward Packets. The SGSN Context procedure and forwarding of packets is described in more detail in connection with FIG. 4A. Step 4-3 is indicative of performance of conventional Security Functions.

Step 4-4 pertains to various PDP context operations; step 4-5 involves Update Location, Cancel Location, and ISD operations. Steps 4-4 and 4-5 are described in more detail subsequently in connection with FIG. 4A.

At step 4-6 SGSN $24_2$ sends an Update SGSN Address Request message to GGSN 20. Prior to sending the Update SGSN Address Request message to GGSN 20, SGSN $24_2$ checks to determine if there are any PDP States (1) that are not active; (2) for which the HLR allows the new SGSN to inform the GGSN of the address of the new SGSN. If these checks are positive, at step 4-6 the Update SGSN Address Request message is sent from SGSN $24_2$ to GGSN 20, with the new message providing the new SGSN address for all PDP Contexts having a Static PDP address and which are not activated.

In response to the message of step 4-6, at step 4-7 GGSN 20 sends an Update SGSN Address Response message to SGSN $24_2$, advising whether the updating of the address for the new SGSN has been successful or not. This is followed (at step 4-8) by Location Updating operations. Then, at step 4-9, a Routing Area Update Accept message is sent from SGSN $24_2$ to mobile station (MS) 40. Lastly, at step 4-10 a Routing Area Update Complete message is sent from mobile station (MS) 40 to SGSN $24_2$.

Figure 4A:
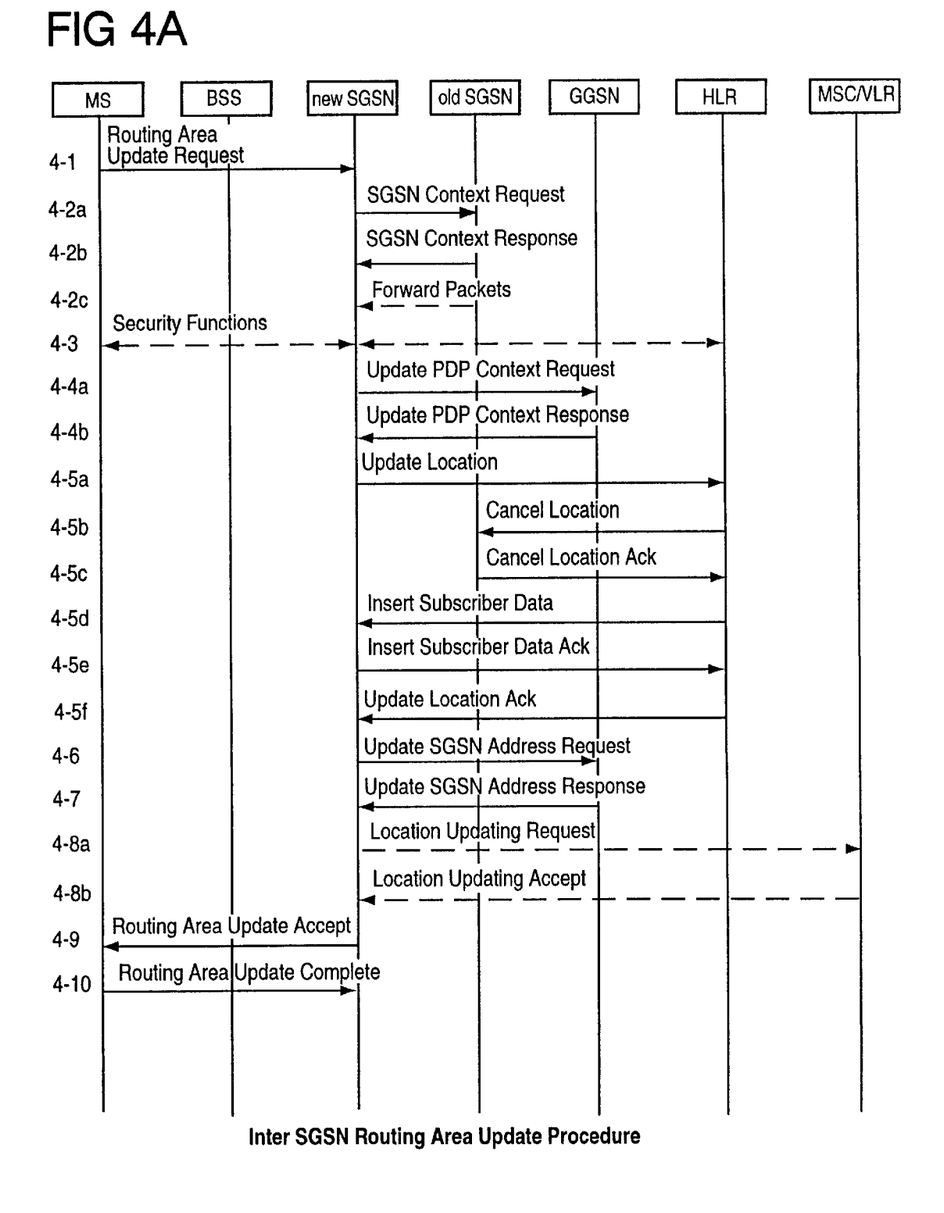
FIG. 4A is a more detailed diagrammatic view of the signal flow for the Inter-SGSN Routing Area Update procedure of the mode of FIG. 4.

Further specifics of the operations performed in FIG. 4 are now described with respect to FIG. 4A. Like FIG. 4, FIG. 4A shows at step 4-1 mobile station (MS) 40 sending a Routing Area Update Request message to the new SGSN (e.g., SGSN $24_2$). The Routing Area Update Request message includes the parameters TLLI, new CI, old RAI, new RAI, CS Connected. The parameter CI is added in the base station system (BSS) to reduce the load on the radio interface. The parameter CS Connected indicates if the mobile station (MS) 40 has an ongoing CS connection. If true, then SGSN $24_2$ does not send a Location Updating Request message to the MSC/VLR (e.g., MSC $28_2$).

Step 4-2 of FIG. 4 generally involved the SGSN Context procedure and Forward Packets procedure. Further details of step 4-2 are shown in FIG. 4A. At step 4-2a the new SGSN (i.e., SGSN $24_2$) sends a SGSN Context Request message to the old SGSN (i.e., SGSN $24_1$) to obtain the MM and PDP contexts for mobile station (MS) 40. The SGSN Context Request message includes the following parameters: old RAI, TLLI, and New SGSN Address. At step 4-2b the old SGSN (i.e., SGSN $24_1$) responds with a SGSN Context Response message. The SGSN Context Response message includes the following parameters: MM Context, PDP Contexts, and LLC Ack. If the mobile station is not known in the old SGSN, the old SGSN responds with an appropriate error message.

The old SGSN (i.e., SGSN $24_1$ stores the address of the new SGSN (e.g., New SGSN Address) until the old MM context is cancelled, to allow the old SGSN $24_1$ to forward data packets to the new SGSN $24_2$. The LLC Ack parameter in the SGSN Context Response message contains the acknowledgments for each LLC connection used by mobile station (MS) 40. Each PDP Context includes the GTP sequence number for the next downlink N-PDU to be sent to mobile station (MS) 40 and the GTP sequence number for the next uplink N-PDU to be tunneled to GGSN 20. The old SGSN $24_1$ starts a timer. At expiry of that timer all contexts for mobile station (MS) 40 are deleted.

As shown by step 4-2c of FIG. 4A, the old SGSN $24_1$ starts a tunneling of buffered N-PDUs to the new SGSN $24_2$. Additional N-PDUs received from GGSN 20 before the time described in step 4-2b expires are also tunneled to the new SGSN $24_2$. N-PDUs which were already sent to the mobile station (MS) 40 and which are not yet acknowledged by mobile station (MS) 40 are tunneled together with the number of the LLC frames which transferred the last segment of the N-PDU.

As in FIG. 4, step 4-3 of FIG. 4A depicts execution of conventional security functions. These security procedures are defined in subclause "Security Function" of the document *Digital Cellular Telecommunications System (Phase 2+), General Packet Radio Service (GPRS) Service Description*, TS GSM 03.60 version 2.0.0. Since TLLI allocation is to be done, a ciphering mode shall be set if ciphering is supported.

Step 4-4 of FIG. 4 represented PDP context operations which are now further described with respect to FIG. 4A. At step 4-4a the new SGSN $24_2$ sends an Update PDP Context Request message to the GGSNs concerned (i.e., GGSN 20).

The Update PDP Context Request message of step 4-4a includes the following parameters: new SGSN Address, TID, and QoS. The GGSNs update their PDP context fields and return an Update PDP Context Response message as indicated by step 4-4b. The Update PDP Context Response message includes the TID.

Step 4-5 of FIG. 4 represented Update Location, Cancel Location, and Insert Subscriber Data (ISD) operations which are now further described with respect to FIG. 4A. At step 4-5a of FIG. 4A the new SGSN $24_2$ informs HLR $26_1$ of the change of SGSN by sending an Update Location message to HLR $26_1$. The Update Location message includes the following parameters: SGSN Address and IMSI. Then, at step 4-5b, HLR $26_1$ cancels the MM context in the old SGSN (i.e., SGSN $24_1$) by sending a Cancel Location message to the old SGSN. The Cancel Location message includes the IMSI of mobile station (MS) 40. If the timer described in step 4-2 is not running, then the old SGSN removes the MM and PDP contexts, and acknowledges at step 4-5c with a Cancel Location Ack message. The Cancel Location Ack message includes the IMSI of mobile station (MS) 40.

At step 4-5d HLR $26_1$ sends an Insert Subscriber Data message to the new SGSN $24_2$. The Insert Subscriber Data message includes both the IMSI and GPRS subscription data for mobile station (MS) 40. In response, at step 4-5e, SGSN $24_2$ acknowledges with an Insert Subscriber Data Ack message. The Insert Subscriber Data Ack message includes the IMSI of mobile station (MS) 40.

HLR $26_1$ acknowledges receipt of the Update Location message by sending, at step 4-6, a Update Location Ack message to SGSN $24_2$. The Update Location Ack message provides the IMSI of mobile station (MS) 40.

Step 4-6 employs the new Update SGSN Address Request message of the invention. At step 4-6 the Update SGSN Address Request message is sent from SGSN $24_2$ to GGSN 20. In the Update SGSN Address Request message SGSN $24_2$ provides, for all PDP Contexts having a Static PDP address that are not activated, the address of the new SGSN (i.e., SGSN $24_2$). As in the earlier-described scenario, the information elements in the Update SGSN Address Request message of step 3-6 include the following: information element, IMSI, SGSN Address, and Update Reason. The Update Reason information element of the Update SGSN Address Request message has, in this second scenario, a value indicative of a GPRS Inter SGSN Routing Area Update Procedure (the situation subsequently described with respect to FIG. 4 and FIG. 4A).

In response to the Update SGSN Address Request message from SGSN $24_2$ at step 4-6, at step 4-7 GGSN 20 sends an Update SGSN Address Response message back to SGSN $24_2$, advising whether the updating of the address for the new SGSN $24_2$ has been successful or not. The information elements in an Update SGSN Address Response message include an Information Element and a Cause.

FIG. 4 has step 4-8 referencing generally Location Updating operations, which are now described in more detail with reference to FIG. 4A. If mobile station (MS) 40 is IMSI-attached and not in a CS connection, the association between SGSN $24_2$ and VLR $29_2$ has to be updated. The address of VLR $29_2$ is derived from the RA information. At step 4-8a SGSN $24_2$ sends a Location Updating Request message to VLR $29_2$. The Location Updating Request message of step 4-8a includes the following parameters: IMSI, SGSN Address, and GPRS Attach State. In response, VLR $29_2$ stores the SGSN Address and (at step 4-8b) acknowledges with a Location Updating Accept message which includes the IMSI of mobile station (MS) 40.

SGSN $24_2$ validates the presence of 40 in the new RA. If due to regional, national, or international restrictions mobile station (MS) 40 is not allowed to attach in the RA or subscription checking fails, then SGSN $24_2$ rejects the routing update with an appropriate cause. If all checks are successful, then SGSN $24_2$ constructs MM and PDP contexts for mobile station (MS) 40. A logical link is established between the new SGSN $24_2$ and mobile station (MS) 40. The new SGSN $24_2$ responds to 40 at step 4-9 with a Routing Area Update Accept message. The Routing Area Update Accept message includes the following parameters: TLLI, PLMN-Supported MT Capabilities, LLC Ack, and Cause.

If PLMN-Supported MT Capabilities indicates that only GPRS MS Class-C mode of operation is supported, i.e., the Gs interface is not installed, than a Class-A or B mobile station shall either: (1) perform an explicit IMSI detach via the non-GPRS control channels (if the MS was already IMSI-attached); or (2) access the non-GPRS control channels for circuit switched (CS) operation (the way that circuit switched operation is performed in parallel with GPRS operation is a MS implementation issue outside the scope of this specification); or (3) avoid all circuit switched signaling (in which case the MS is implicitly IMSI detached after a while).

If the PLMN-Supported MT-Capabilities parameter indicates that also GPRS MS Class A and B mode of operation is supported, and the mobile station used to be communicating with a SGSN that only supports Class-C mode of operation, then a Class-A or B mobile station that needs to perform IMSI attach and Location Updates shall do this via the SGSN. Moreover, if that Class-A or B mobile station is already IMSI-attached, it immediately performs a Location Update via the SGSN to allow the VLR to store the SGSN address.

The LLC Ack parameter of the Routing Area Update Accept message contains the acknowledgments for each LLC connection used by the mobile station, thereby confirming all mobile-originated N-PDUs successfully transferred before the start of the update procedure.

At step 4-10, mobile station (MS) 40 acknowledges the new TLLI with a Routing Area Update Complete message. The Routing Area Update Complete message includes the following parameters: TLLI and LLC Ack. The LLC Ack parameter contains the acknowledgments for each LLC connection used by the mobile station, thereby confirming all mobile-terminated N-PDUs successfully transferred before the start of the update procedure. If LLC Ack parameter confirms reception of N-PDUs that were forwarded from the old SGSN, then these N-PDUs shall be discarded by the new SGSN. LLC and SNDCP in the MS are reset locally.

In the case of a rejected routing update operation, due to Routing Area restrictions, the new SGSN does not construct a MM context. A reject is returned to the mobile station with an appropriate cause. The mobile station does not re-attempt a routing update to that RA. The RAI value is deleted when the mobile station is powered-up.

In the case of no reply from base station system (BSS) node $30_1$, the new SGSN $24_2$ does not construct a MM context. Instead, a reject is returned to the MS with an appropriate cause. The mobile station may re-attempt updating to the same RA. As an option, the SGSN may retry the operation before rejecting the routing update.

If routing area update procedure fails a maximum allowable number of times, or if the Routing Area Update Accept Cause parameter indicates a reject, the mobile station enters IDLE state.

Thus, also in the second scenario the two new GTP messages—"Update SGSN Address Request" message and the "Update SGSN Address Response"—play an important role. In fact, the Update SGSN Address Request message is sent from the new SGSN $24_2$ node to the GGSN node as part of both the GPRS Attach procedure and the GPRS Inter SGSN Routing Area Update procedure.

One advantage of the present invention is that it allows the operator to decide for Mobile Terminating Cases which inactive PDP Context will receive packet switched information.

For further reading regarding example systems and environments in which the present invention can be utilized, see the following documents which are incorporated herein by reference:

(1) Digital Cellular Telecommunications System (Phase 2+)

General Packet Radio Service (GPRS)

Service Description

TS GSM 03.60 version 5.3.0

(2) Digital Cellular Telecommunications System (Phase 2+)

General Packet Radio Service (GPRS)

Service Description

TS GSM 09.60 version 1.7.0

(3) Digital Cellular Telecommunications System (Phase 2+)

Mobile Application Part (MAP) Specification

TS GSM 09.02 version 5.7.0

Figure 5A:
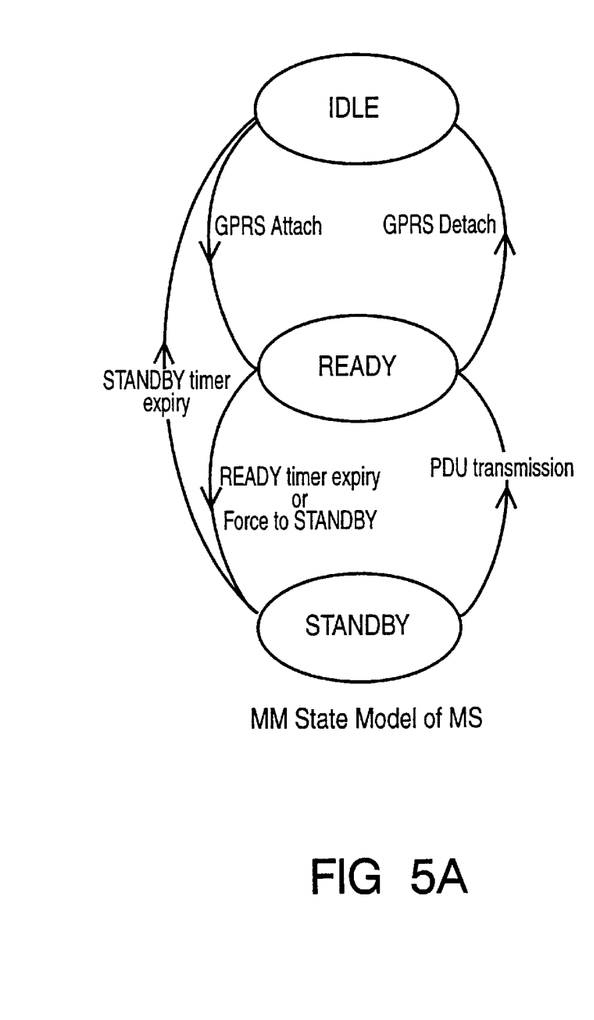
FIG. 5A and FIG. 5B are diagrammatic views of mobility management state models of the mobile station and SGSN node.
Figure 5B:
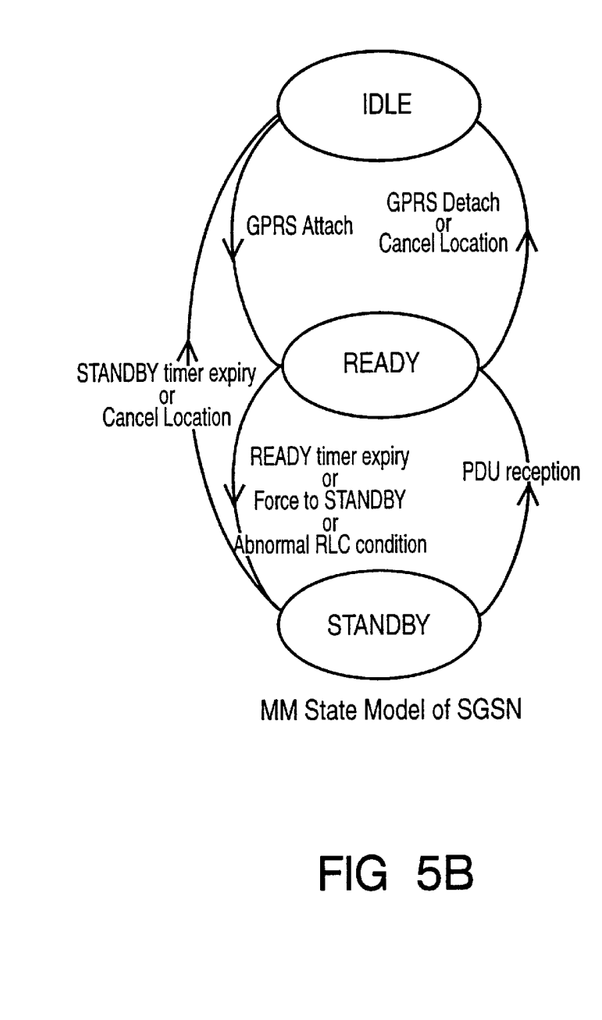

FIG. 5A and FIG. 5B show functional mobility management state models of the mobile station and the SGSN.

While the invention has been particularly shown and described with reference to the preferred embodiments thereof, it will be understood by those skilled in the art that various alterations in form and detail may be made therein without departing from the spirit of the invention.

TABLE 1

HLR GPRS Subscription Data

| Field | Description |
| --- | --- |
| IMSI | IMSI is the main reference key. |
| MSISDN | MSISDN of the MS for SMS |
| SGSN SS7 Address | The SS7 address of the SGSN currently serving this MS. |
| SGSN IP Address | The IP address of the SGSN currently serving this MS |
| SNS Parameters | SMS-related parameters, e.g., operator-determined barring |
| MS Purged for GPRS | Indicates that the MM and PDP contexts of the MS are deleted from the SGSN |
| MNRG | Indicates that the MS is not reachable through an SGSN, and that the MS is marked as not reachable for GPRS at the SGSN and possibly at the GGSN. |
| GGSN-list | The GSN number and optional IP addresses pair related to the GGSNs that shall be contacted when activity from the MS is detected and MNRG is set. The GSN number shall be either the number of the GGSN or the porotcol-converting GSN as described in the subclauses "MAP-based GGSN - HLR Signalling" and "GTP and MAP-based GGSN - HLR Signalling" Each IMSI contains zero or more of the following PDP context subscription records: |

TABLE 1-continued

HLR GPRS Subscription Data

| Field | Description |
| --- | --- |
| PDP Type | PDP type, e.g., X.25 or IP |
| PDP Address | PDP address, e.g., an X.121 address. This field may be empty if dynamic addressing is allowed. |
| QoS Profile Subscribed | The quality of service subscribed for this PDP context. QoS Profile Subscribed is the default level if a particular QoS profile is not requested. |
| VPLMN Address Allowed | Specifies whether the MS is allowed to use a dynamic address |
| VPLMN Address Allowed | Specifically whether the MS is allowed to use the APN in the domain of the HPLMN only, or additionally the APN in the domain of the VPLMN. |
| Access Point Name | A label according to DNS naming conventions describing the access point to the external packet data network |

TABLE 2

Information Elements in an UpdateSGSNAAddressRequest

| Field | Description |
| --- | --- |
| SGSN Address Updating Allowed | Specifies whether the subscriber is allowed to update its SGSN address to its GGSN when he is not GPRS active and after GPRS Attach or Inter SGSN Routing Area Update |

TABLE 3

SGSN MM and PDP Contexts

| Field | Description |
| --- | --- |
| IMSI | IMSI is the main reference key |
| MM State | Mobility management state, IDLE, STANDBY, or READY |
| P-TMSI | Packet Temporary Mobile Subscriber Identity |
| IMEI | International Mobile Equipment Identity |
| P-TMSI Signature | A signature used for identification checking purposes |
| Routing Area | Current routing area |
| Cell Identity | Current cell, only valid in READY state |
| VLR Number | The VLR number of the MSC/VLR currently serving this MS |
| New SGSN Address | The IP address of the new SGSN where buffered and not sent N-PDUs should be forwarded to |
| TLLI | Temporary Logical Link Identity |
| Authentication Triplets | Authentication and ciphering parameters |
| Cell Identify | Current cell, only valid in READY state |
| Kc | Currently used ciphering key |
| CKSN | Ciphering key sequence number of Kc |
| Ciphering algorithm | Selected ciphering algorithm |
| MS Class Classmark | The GPRS MS class, A, B, or C MS classmark |
| DRX Parameters | Discontinuous reception parameters |
| MNRG | Indicates whether activity from the MS shall be reported to the HLR |
| NGAF | Indicates whether activity from the MS shall be reported to the MSC/VLR |
| MSISDN | MSISDN of the MS for SMS |
| SMS Parameters | SMS-related parameters, e.g., operator-determined barring |
| Recovery | Indicates if HLR or VLR is performing database recovery |
| | Each MM context contains zero |

TABLE 3-continued

SGSN MM and PDP Contexts

| Field | Description |
|---|---|
| *or more of the following PDP contexts:* | |
| PDP Type | PDP type, e.g., X25 or IP |
| PDP Address | PDP address, e.g., an X.121 address |
| NSAPI | Network layer Service Access Point Identifier |
| PDP State | Packet data protocol state, INACTIVE or ACTIVE |
| GGSN Address in Use | The IP address of the GGSN currently used by the activated PDP context |
| VPLMN Address Allowed | Specifies whether the MS is allowed to use the APN in the domain of the HPLMN only, or additionally the APN in the domain of the VPLMN |
| Compression | Negotiated data compression parameters |
| QoS Profile Subscribed | The quality of service profile subscribed for this PDP context |
| QoS Profile Requested | The quality of service profile requested upon PDP Context Activation |
| QoS Profile Negotiated | The quality of service profile negotiated for this PDP context |
| SND | GTP sequence number of the next downlink N-PDU to be sent to the MS, only for connection-oriented PDP types |
| SNU | GTP sequence number of the next uplink N-PDU to be sent to the GSSN, only for connection-oriented PDP types |
| Reordering Required | Specifies whether the SGSN shall reorder N-PDUs before delivering the N-PDUs to the MS |

What is claimed is:

1. A mobile telecommunications network comprising:
a gateway node through which the mobile telecommunications network is connected to a data packet network;
a serving node which serves a mobile station and which sends an update message to the gateway node prior to the mobile station performing a packet data protocol context activation, the update message providing to the gateway node an address of the serving node for use with the packet data protocol context.

2. The network of claim 1, wherein the serving node makes a selective determination whether to send the update message with respect to a particular packet data protocol context.

3. The network of claim 2, wherein the selective determination is based on data in an update allowance field stored in a memory.

4. The network of claim 3, wherein the update allowance field is stored at a home location register for the mobile station.

5. The network of claim 3, wherein the update allowance field is stored at the serving node for the mobile station.

6. The network of claim 1, wherein the update message is sent in connection with an attach procedure.

7. The network of claim 1, wherein the update message is sent in connection with an inter-serving node routing area update procedure.

8. The network of claim 1, wherein the serving node is a serving packet radio service node for GPRS.

9. A serving node of a mobile telecommunications network, the mobile telecommunications network including a gateway node through which the mobile telecommunications network is connected to a data packet network, and wherein the serving node serves a mobile station and sends an update message to the gateway node prior to the mobile station performing a packet data protocol context activation, the update message providing to the gateway node an address of the serving node for use with the packet data protocol context.

10. The node of claim 9, wherein the serving node makes a selective determination whether to send the update message with respect to a particular packet data protocol context.

11. The node of claim 10, wherein the selective determination is based on data in an update allowance field stored in a memory.

12. The node of claim 11, wherein the update allowance field is stored at a home location register for the mobile station.

13. The node of claim 11, wherein the update allowance field is stored at the serving node for the mobile station.

14. The node of claim 9, wherein the update message is sent in connection with an attach procedure.

15. The node of claim 9, wherein the update message is sent in connection with an inter-serving node routing area update procedure.

16. The node of claim 9, wherein the serving node is a serving packet radio service node for GPRS.

17. A method of operating a mobile telecommunications network which comprises a gateway node through which the mobile telecommunications network is connected to a data packet network, the method comprising sending from a serving node, which serves a mobile station, an update message to the gateway node prior to the mobile station performing a packet data protocol context activation, the update message providing to the gateway node an address of the serving node for use with the packet data protocol context.

18. The method of claim 17, further comprising making a selective determination at the serving node whether to send the update message with respect to a particular packet data protocol context.

19. The method of claim 18, further comprising making the selective determination on the basis of data stored in an update allowance field of a memory.

20. The method of claim 19, wherein the update allowance field is stored at a home location register for the mobile station.

21. The method of claim 19, wherein the update allowance field is stored at the serving node for the mobile station.

22. The method of claim 17, further comprising sending the update message in connection with an attach procedure.

23. The method of claim 17, further comprising sending the update message in connection with an inter-serving node routing area update procedure.

24. The method of claim 17, wherein the serving node is a serving packet radio service node for GPRS.

\* \* \* \* \*